Figure 1:
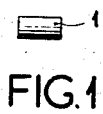

Sept. 3, 1963 A. C. HELWIG ETAL 3,102,729
METHOD OF MANUFACTURING ARTICLES PROVIDED
WITH A DIAMOND, IN PARTICULAR
GRAMOPHONE NEEDLES
Filed Oct. 12, 1959

INVENTOR
A. C. HELWIG
A. LANGENBERG
BY L. M. L. J. LEBLANS

AGENT 3,102,729
METHOD OF MANUFACTURING ARTICLES PROVIDED WITH A DIAMOND, IN PARTICULAR GRAMOPHONE NEEDLES
Antonius Cornelis Helwig, Adrianus Langenberg, and Leopold Michael Lambert Joseph Leblans, all of Eindhoven, Netherlands, assignors to North American Philips Company, Inc., New York, N.Y., a corporation of Delaware
Filed Oct. 12, 1959, Ser. No. 845,908
Claims priority, application Netherlands Nov. 15, 1958
7 Claims. (Cl. 274—38)

This invention relates to a method of manufacturing an article provided with a diamond, in particular a diamond gramophone record reproducing needle. It is known to bore these needles from a diamond by means of rapidly rotating and oscillating metal tubes. Such a bored needle has a length of approximately 0.8 mm. and a thickness of approximately 0.3 mm. and still can be handled and mounted comparatively readily. In view of the large quantities of diamond needles to be manufactured, it is obviously important to use as little diamond material as possible, however, if the said size is reduced, handling and mounting become very difficult. The invention permits of using both splinters and bored diamonds of much smaller sizes without giving rise to handling or mounting difficulties. According to the present invention, a method of manufacturing articles provided with a diamond, in particular diamond gramophone needles, is characterized by the following steps: Degreasing a piece of diamond of the required size, if required roughening it superficially in a gas atmosphere containing oxygen at a temperature of 800° C., inserting it in a helically coiled cylindrical metal spring which has a length greater than that of the diamond and is closed at one end, closing the open end of this spring by means of a metal rod which is inserted until it engages the diamond, dipping the spring together with a part of the rod in a soldering bath, cooling the assembly, removing the closed end of the spring by grinding, the emerging end of the diamond being provided with a point of the required dimensions by grinding and polishing. Owing to the method in accordance with the invention, splinters or needles of very small dimensions can readily be handled and mounted; the rods can be used not only as gramophone needles but also as engraving and scratching needles and are even suitable for accommodation in a tool holder.

The dimensions of the spring and the rod can be chosen so that the rod fits pinchingly in the spring. Preferably, however, in view of the small strength of the component parts, in one embodiment of the invention the rod and the spring are joined to one another by spot welding so that the rod is allowed a slight amount of play in the spring.

Although splinters can be used, in practice it proves preferable to use, according to an embodiment of the invention, a diamond cylinder obtained in known manner by boring. Splinters cannot be examined concerning bubbles, cracks or other defects and, in grinding, the reject percentage is greater than with bored rods. Furthermore, rod-shaped diamonds can readily be orientated with respect to their crystal axes. According to a further embodiment of the invention, the spring and the rod are made of molybdenum or tungsten in view of the high melting point of these metals and the insolubility in the solder.

According to another embodiment of the invention, the soldering material used is an alloy of copper, silver and titanium, preferably an alloy containing approximately 72% of silver and 28% of copper to which approximately 4% of titanium has been added.

When using the method in accordance with the invention, in an embodiment of the invention the diamond cylinder preferably is approximately 0.2 mm. thick and 0.4 mm. long.

The invention also relates to a gramophone needle manufactured by the said method.

Figure 2:
Figure 3:
Figure 4:
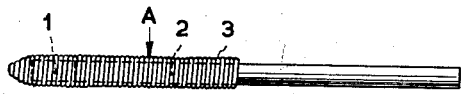
Figure 5:
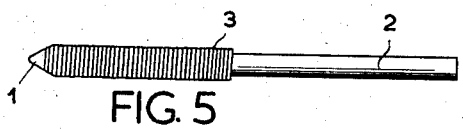

In order that the invention may readily be carried out, an embodiment thereof will now be described in detail with reference to the accompanying drawing, in which:

FIGURE 1 shows a bored diamond rod;
FIGURE 2 shows a molybdenum rod;
FIGURE 3 shows a cylindrical helically wound molybdenum spring closed at one end;
FIGURE 4 shows the components of FIGURES 1, 2 and 3 after assembly and
FIGURE 5 shows a completed gramophone needle.

FIGURE 1 shows a rod 1 which is bored from a diamond by means of a rapidly rotating and oscillating metal tube, the boring end of this tube being provided with diamond dust in oil. The rod is approximately 0.2 mm. thick and approximately 0.4 mm. long. FIGURE 2 shows a molybdenum rod 2, which is approximately 0.2 mm. thick also and approximately 12 mm. long. A cylindrical helically coiled spring 3 is wound from molybdenum wire, one end 4 being closed. The inner diameter of the spring slightly exceeds 0.2 mm. The diamond rod 1 of FIGURE 1 is degreased in a suitable bath, roughened in a gas atmosphere containing oxygen at a temperature of 800° C. and introduced into the spring 3, after which the rod 2 is inserted into this spring so as to engage the diamond 1, as is shown in FIGURE 4. The spring 3 and the rod 2 are now joined together at a point A by spotwelding and then the pointed end of the assembly is immersed in a soldering bath consisting of an alloy of 72% of solder and 28% of copper to which approximately 4% of titanium has been added. After cooling, the closed end 4 of the spring is removed and the emerging part of the diamond 2 is sharpened by grinding and polishing, so that a needle 5 (FIGURE 5) is obtained, which, unlike the piece of diamond 1, can be handled and mounted comparatively readily.

The known diamond needles have a diameter of 0.3 mm. and a length of 0.8 mm. When using the method in accordance with the invention, in which use is made of a diamond having a diameter of 0.2 mm. and a length of 0.4 mm., less than one quarter of diamond material is employed so that a considerable saving in by far the most expensive material is effected.

The diamond together with the rod can also be used as an engraving or cutting diamond after mounting in a holder; alternatively, it may be used as a diamond cutting tool.

It is not necessary to use bored pieces of diamond. Splinters can also be employed, however, practice has shown that, in this event, material defects in the splinters give rise to a high reject percentage in grinding. However, if the splinters are much cheaper than the manufactured cylinders, the use of splinters may be more economical. The use of silver, copper and titanium as soldering material is not necessary either. Another solder may be used, provided that it adheres to diamond. In practice, very good results are obtained with the use of the said alloy.

Furthermore, instead of molybdenum, the springs and rods may be made of tungsten and, in general, of any metal having a high melting point which is not materially affected by the soldering metals or does not change the properties of the soldering material.

If the springs can be made with a degree of accuracy such that the rod 2 fits pinchingly in them, the spot-welding at A can be dispensed with.

In general, a bored diamond needle has a rough cylindrical surface, so that roughening is not necessary. However, if this needle is obtained by breaking a longer needle into lengths the top and bottom surfaces are completely smooth so that they must be roughened. This may also be desirable for the splinters, both found as such and manufactured, to be roughened to provide satisfactory adherence.

What is claimed is:

1. A method of manufacturing a diamond phonograph needle, comprising the steps of degreasing a diamond of the required dimensions, introducing said diamond into a helically wound metal cylindrical spring closed at one end, said spring being longer than the diamond, inserting a metal rod into the open end of said spring and positioning said metal rod in contact with said diamond and the inner surface of said spring, then soldering together said spring, diamond and metal rod, removing by grinding the closed end of said spring and then grinding and polishing the free end of said diamond to produce a point of the required dimensions.

2. A gramophone needle manufactured by the method of claim 1.

3. The method of claim 1 wherein the diamond is superficially roughened in an oxygen containing atmosphere at a temperature of 800° C. before being inserted into the spring.

4. The method of claim 1 wherein the rod and the spring are joined to one another by spot-welding.

5. The method of claim 4, wherein a diamond cylinder is used as the diamond.

6. The method of claim 1 wherein the spring and the rod are made of a metal selected from the group consisting of molybdenum and tungsten.

7. The method of claim 6 wherein the soldering material used is an alloy of approximately 72% of silver and 28% of copper to which about 4% of titanium has been added.

References Cited in the file of this patent
UNITED STATES PATENTS

| | | |
|---|---|---|
| 1,587,805 | Taylor | June 8, 1926 |
| 1,914,658 | Funk | June 20, 1933 |